March 16, 1965  G. P. TOUEY ET AL  3,173,426
TOBACCO SMOKE FILTER
Filed Oct. 9, 1961
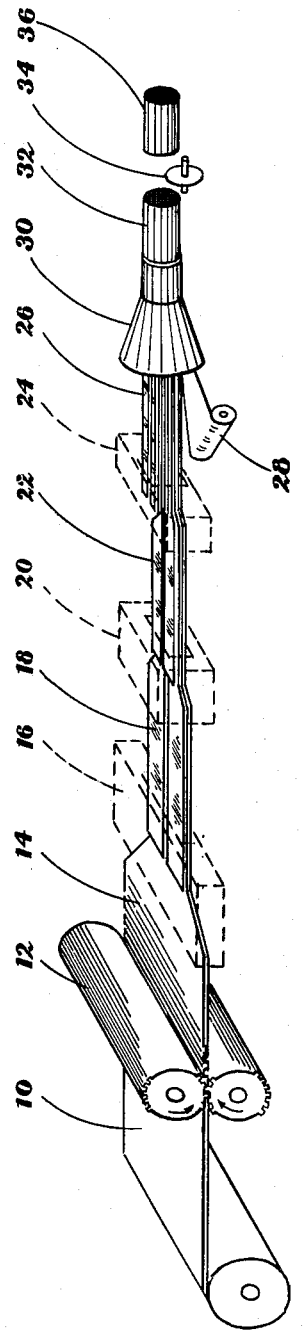
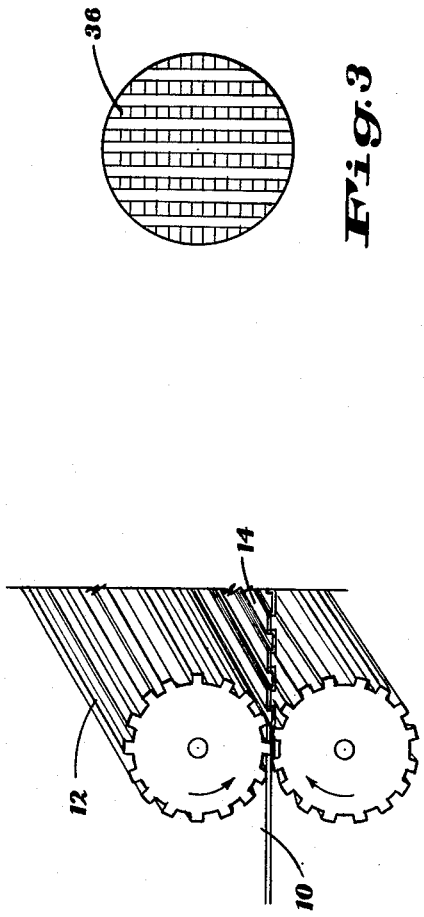
George P. Touey
Robert C. Mumpower, II
INVENTORS
BY
ATTORNEYS United States Patent Office 3,173,426
Patented Mar. 16, 1965

3,173,426
TOBACCO SMOKE FILTER
George P. Touey and Robert C. Mumpower II, Kingsport, Tenn., assignors to Eastman Kodak Company, Rochester, N.Y., a corporation of New Jersey
Filed Oct. 9, 1961, Ser. No. 143,604
2 Claims. (Cl. 131—208)

This invention relates to the preparation of a new type of filter for cigarettes. More particularly, it involves a novel cigarette filter produced from a continuous, thin film of a thermoplastic poly-α-olefin.

A wide variety of materials has been recommended as filters for cigarettes. However, those which have been most successful commercially have been prepared from fibrous materials in the form of paper or textile tows. The main reason for this has been the fact that these materials can be obtained in the form of a continuous sheet such as a roll of paper or in the form of a bundle of continuous fibers such as a textile tow. In this form they are readily processed into filter rods in a continuous manner and at high production rates. For example, a textile tow can be continuously fed into a cigarette filter rod assembly machine at a rapid rate as described in the Crawford-Stevens Patent 2,794,239. A roll of tissue paper can also be continuously pleated, folded, or the like and subsequently led through a filter rod-making assembly.

Therefore, a continuous crimped tow or a continuous sheet of cellulose fibers has a decided filter processing advantage over filter materials in a noncontinuous form such as shredded paper, cotton wads, asbestos fibers, activated carbon granules, or the like. Despite these advantages, however, research is constantly underway to further improve the compactness or firmness of such materials in order to allow filter rods made therefrom to be prepared more simply and economically and to be more cleanly cut into segments of filter tip length even more pleasing to the smoker. In general, a plasticizer such as glycerol triacetate is used to impart rigidity to a cellulose ester filter rod. Accordingly, a filter rod which could be manufactured without the addition of a plasticizer or bonding agent to a tow is highly desirable. By bonding agent we mean any agent which would impart firmness or rigidity to the finished filter rod. In the case of continuous tows of other textile materials, the problem is even more accentuated since the plasticizer technique is sometimes inoperative and sticky adhesives must be used to harden the filter rod. Such adhesives produce an extremely tacky tow which must be dried before it is processed on a filter rod-making machine. Otherwise, the tow will adhere to the various parts of the machine. In the case of a filter prepared from paper, as for example a roll of soft absorbent paper, the filter may not only be too soft but also become even softer during the smoking operation due to contact with the smoker's tongue. This is because such fibers are quite hydrophilic. They are capable of becoming soggy and absorbing moisture from the smoke and otherwise changing the taste.

It is also usually necessary to crimp or pleat cellulose filters in the direction of the longitudinal axis of the filter rod to give the proper amount of packing or body to the rod. This tends to produce channels in the filter through which a certain proportion of the tiny tar particles can pass untouched and may thus weaken or tear the paper to the point where it cannot be processed into filters in a rapid, economical manner. Accordingly, a filter wherein substantially no channeling can occur is an extremely desirable object. Also, sheets of cellulose fibers are not thermoplastic, and, therefore, cannot be crimped in a permanent manner, as for example a sheeting of a thermoplastic material. Certain textile tows, such as cellulose acetate, are thermoplastic and can be crimped but due to the material being continuous only in one direction within the filter some channeling is still possible since across the filter each fiber length is a discrete increment of the entire bundle of fibers.

In U.S. Patent 2,966,157, we have disclosed the use of crimped polyolefin fibers in cigarette filters. In such a use, just as in the case of crimped textile tows, nevertheless, a substantial amount of smoke still is allowed to follow a continuous path between the fibers and on through the filter. Also, when polyolefin fibers are used, they are naturally somewhat soft unless bonded, and if bonded, an additional, not inexpensive manufacturing step is required, as explained above. In addition a heavy wrapping material is often necessary for filters made from polyolefin tow.

Thus, particularly in view of the current interest in filters of the class described, it is apparent that the development of a filter which requires no bonding agent nor heavy wrapper in the preparation thereof and which in addition removes a substantial portion of the tarry matter in the smoke represents a highly desirable result.

This invention has for one object to provide a novel filter rod susceptible to little or no by-passing of cigarette smoke and easily prepared in a rapid, continuous manner. Another object is to provide a filter rod which may be prepared without the application of plasticizer, glue, or other form of hardening or bonding agent. Still another object is to provide a filter rod containing a material which absorbs substantially no moisture and does not become soft or soggy. A further object is to provide a filter rod comprising material of enhanced inherent strength and thermoplastic qualities. A still further object is to provide a filter rod of lower pressure drop per unit length than many prior art filter rods of substantially equivalent tar removal efficiency. Other objects will appear hereinafter.

In the broader aspects of the present invention we have found that by crimping a roll of polyolefin film 0.5 to 2 mils thick in a direction perpendicular to the length of the film to up to 50 crimps per inch and by folding, creasing or otherwise compacting the highly crimped film and wrapping and cutting same, we obtain, without the addition of a plasticizer or bonding agent, a strong, clean-cut, rigid, substantially non-moisture absorbing or highly hydrophobic filter rod. We have found that polyolefin film crimped to contain from 18 to 50 crimps per inch, compacted into a filter by folding or pleating or other appropriate manner in a lengthwise direction and wrapped with conventional cigarette paper or otherwise appropriately coated and cut to the desired length produces the rigid, clean-cut filter rod of this invention. By coated we mean wrapped or having a fused sheath or other appropriate coating, which would maintain a bundle of the film crimped as above in the form of a cylindrical filter rod.

The polyolefin material which we prefer to use has a molecular weight above 10,000 and below 800,000. Preferably the molecular weight of the polyolefin material would be between 30,000 and 200,000. The softening point of the polyolefin polymer which we prefer to use is between 85° C. and 160° C. Of the several polyolefin materials produced industrially we prefer those known as polyethylene and polypropylene. The structural unit for polyethylene can be represented as:

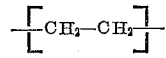

The structural unit for polypropylene can be represented as:

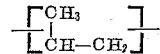

Either low density polyethylene, namely polyethylenes having a softening point of about 90° C. to 100° C. or high density polyethylenes which have a softening point of 110° C. to 140° C. can be used in preparing the filters of the present invention.

The particular method of manufacturing the polyolefin material is not a part of the present invention and is known to the industry concerned with such manufacture. In other words, the desired polyolefin material can be obtained from a manufacturer by giving the above specifications of molecular weight and other properties to such manufacturer. It will be noted, however, that the polyolefin material used in the present invention is a material resistant to moisture.

Any method known to the art for crimping a film in a direction perpendicular to its length may be used to crimp the film of this invention. Thus, for example, the film can be pulled from a roll and guided through a series of rollers containing cogs that intermesh. Another method is to fold the film lengthwise and run it through a crimper of the type used from crimping tows of cellulose acetate fibers, e.g. as shown in our abovementoned U.S. Patent 2,966,157. After crimping it may be reopened to its full width and rewound on a roll. Still another method is to run the film through a die capable of imparting corrugations to it by means of a heat and pressing operation. The method of imparting the crimps is unimportant provided they are substantially parallel to each other and in a direction perpendicular to the length of the film. Just pleating or creping the film parallel to its length will not give the desired rigidity to the finished filter rod. Also, these crimps or grooves or such running perpendicular to the film's length result in a more effective filter by disrupting the channeling of the smoke through the filter which occurs when the grooves or pleats are in a filter parallel to its length only. The film grooves or crimps according to our invention need not be continuous from one edge of the film to the other.

There are various types of crimping apparatus that may be used. Examples of satisfactory crimping devices are described in the following U.S. Patents: 2,090,669; 2,311,174; 2,505,618; 2,698,970; 2,734,228; 2,734,229; 2,734,251; 2,740,992 and 2,749,233. Most of the commercial crimping devices for textile tows are of the "stuffing-box" type, although in some instances the "gear type" is used. Both of these types are discussed in the patents listed above. We prefer the "stuffing-box" type of crimping apparatus since it readily permits putting in a range of crimp from about six crimps per inch up to, for example, 50 crimps per inch of an amplitude between about 0.10 inch and 0.01 inch.

By crimps per inch we mean the number of convolutions per inch of film length. By amplitude of crimps we mean the height of each convolution.

The width of the polyolefin film will depend mainly on the thickness of the film. The heavier films (i.e., 1 to 2 mils) do not require as much width when properly compacted by folding, pleating, creping, or the like into the form of a filter rod as the lighter films (0.5 to 1 mil). The preferred width of the film is from 18 to 65 inches; the preferred film thickness is 0.5 to 1.5 mils.

The polyolefin film preferred for use has a softening point between 90° C. and 140° C. and a molecular weight range above 10,000 and below 800,000. The preferred film is one which is unoriented (unstretched) lengthwise and widthwise. The film may be made by conventional melt extrusion techniques known to the art and may contain $TiO_2$ or other whitening agents which may be added to the molten polyolefin prior to the extrusion step.

For a better understanding of our invention reference is made to the attached drawing which forms a part of the present specification and is illustrative of our invention.

FIGURE 1 is a schematic representation of the various steps of the process of this invention from the crimping of the polyolefin film to the cutting of the filter rod.

FIGURE 2 is an enlarged perspective view of the portion of FIGURE 1 showing the polyolefin film being crimped by crimping rolls.

FIGURE 3 is a diagrammatic end view of a cylindrical filter rod containing crimped and folded polyolefin film in accordance with our invention.

According to our invention a sheet of polyolefin film 10 may be conducted between crimping rolls 12 and converted into a film 14 containing parallel grooves or crimps extending from side to side of said film. The crimped film may then be conducted through a first film folding cabinet 16, where it is folded upon itself to the form indicated at 18, next through a second film folding cabinet 20, where it is folded again upon itself to the form indicated at 22, and finally through a third film folding cabinet 24, where it is further folded upon itself to the form indicated at 26. Paper or other wrapping material 28 is conducted along with the crimped and folded polyolefin film 26 into garniture 30, wherein it is compacted and wrapped into a rod-like filter form 32, which is then cut by cutter 34 into a finished filter element 36.

A further understanding of our invention will be had from a consideration of the following examples, which are illustrative of the preferred embodiments of our invention.

*Example I*

A continuous film of unstretched polyethylene, 0.5 mil in thickness and 50 inches in width, was pulled between two grooved rolls, the grooves of which intermeshed and extended the entire length of the rolls. The rolls, which extended across the entire width of the film, imparted a creped or corrugated effect to the film, forming 30 crimps per linear inch of film. After the film left the crimping rolls, it was pulled through a series of creasing devices which ultimately compacted it into a continuous bundle. This bundle was then guided through the garniture of a conventional filter rod-making device which wrapped it with cigarette paper, sealed the edges of the paper with glue, and cut the rod into 90-mm. lengths, each rod being 25.5 mm. in circumference.

This finished rod was quite rigid. It was cut into filter tip lengths of 15 mm. without being crushed or otherwise distorted. Several of these filter tips were attached to cigarettes and the cigarettes were smoked on an automatic smoking machine similar to the one described by J. A. Bradford, W. R. Harlan and H. R. Hanmer in Ind. Eng. Chem. 28, 836–939 (1936). The results indicated that the filters removed 25% more tar and 23% more nicotine than an equivalent length of tobacco After the smoking test, the filters were found to be still quite rigid and highly and uniformly stained with tar. Smoking tests by mouth also revealed that the filters remained rigid even though these cigarettes were smoked to a point only 5 mm. below the end of each filter. The filters had pressure drops of only 1 to 1.2 inches at an air flow rate of 17½ ml./sec. Prior art commercial filters with the same degree of tar removal efficiency oftentimes have pressure drops of 2 inches or more for filters of equivalent length.

*Example II*

The experiment of Example I was repeated except that in this case an unstretched film of polypropylene 1 mil thick and 30 inches wide was used. The finished rod (25 mm. circumference) was very rigid and was easily and cleanly cut into smaller segments. Smoking tests such as those preferred in Example I revealed that 15 filters cut from these rods removed 18% more tar and 20% more nicotine than the equivalent length of tobacco they replaced. The filters had pressure drops of 0.5–0.8 inch as compared to pressure drops of 1.5 to 2.0 with substantially the same tar removal efficiency for comparable plasticized cellulose acetate filters. In the stuffer-box type crimper, two opposing rolls under pressure force the material to be crimped, in this case the film, into the chamber with a constricted exit causing the material to be folded and packed on itself to form a crimp, specifically a crosswise crimp, perpendicular to the length of the film. Such type crimping devices are described in detail in a number of U.S. patents, e.g. 2,115,313; 2,156,723; 2,187,567; 586,052 and 1,353,337.

*Example III*

A continuous film of unstretched polypropylene, 0.5 mil in thickness and 40 inches in width, was folded to a width of 20 inches and fed to a stuffer-box type crimper such as normally used to crimp textile tows. This crimper produced a crimped film containing 18 crimps per linear inch of film. The film was then pulled through an assembly which folded it lengthwise into a continuous bundle. This bundle was then guided through the garniture of the filter-making assembly, whereupon it was wrapped in cigarette paper, sealed and cut into 90-mm. segments of 25.55 mm. circumference.

Due to the rigidity of the rod, it was easily cut into 15-mm. filter tips without being crushed. These filters had pressure drops within the range of 0.5 to 0.7 inch. On cigarettes these removed about 20% more tar and 21% more nicotine than the 15 mm. of tobacco they replaced. Crimped cellulose acetate, poly-propylene and polyethylene tow filter rods similarly produced and containing no plasticizer or bonding agent were soft and easily crushed, the ends being frayed upon cutting into the 15-mm. filter tips. The cellulose acetate, polypropylene, and polyethylene tow filter tips gave pressure drops of greater than 2 with comparable tar removable efficiency.

It is believed apparent from the foregoing that we have provided a new tobacco smoke filter exhibiting a surprising combination of increased firmness or rigidity, hydrophobic power and lower pressure drop with equal or better tar removal efficiency than that often encountered in prior-art filters. In addition, our filter is rigid and of improved lasting strength without the necessity of such heating, bonding, plasticizing, or heavy wrapping as ordinarily required in cigarette filters.

Although the invention has been described in considerable detail with particular reference to certain preferred embodiments thereof, variations and modifications can be effected within the spirit and scope of the invention as described hereinabove, and as defined in the appended claims.

We claim:
1. A rod-shaped tobacco smoke filter element comprising compacted polyolefin plastic non-fibrous melt-extruded film 18–65 inches wide and less than 5 mils thick crimped to 18 to 50 crimps per inch in a direction substantially perpendicular to the length of said element, said polyolefin having a molecular weight of from 10,000 to 800,000 and a melting point of from 85° C. to 160° C. and said filter element being characterized by a rigidity sufficient to permit cutting into 15 mm. tips without being crushed and a lowered pressure drop of less than about 1.5 inches of water with an air flow rate of 17½ ml./sec. and at a high tar removal efficiency.

2. A substantially cylindrical tobacco smoke filter rod comprising polyethylene plastic non-fibrous melt-extruded film 0.1 to 5 mils thick and 18–65 inches wide crimped in a direction substantially perpendicular to the length of said rod to the order of 18 to 50 crimps per inch and compressed in substantially rectangular sections folded on one another in a single piece along lines substantially at right angles to the direction of crimp, said polyethylene having a molecular weight of from 30,000 to 200,000 and a softening point of 90° C. to 140° C. and said rod having a pressure drop of less than about 1.5 inches of water at a flow rate of 17.5 ml./sec. as compared to a higher pressure drop of up to 2 and greater for a plasticized cellulose acetate filter rod of substantially the same tar removal capacity and lengthand a rigidity sufficient to permit cutting into 15 mm. tips without being crushed.

References Cited in the file of this patent
UNITED STATES PATENTS

| | | |
|---|---|---|
| 2,164,702 | Davidson | July 4, 1939 |
| 2,228,383 | Berl | Jan. 14, 1941 |
| 2,688,380 | MacHenry | Sept. 7, 1954 |
| 2,707,308 | Taylor et al. | May 3, 1955 |
| 2,754,829 | Hess | July 17, 1956 |
| 2,849,932 | Marogg | Sept. 2, 1958 |
| 2,916,038 | Wade | Dec. 8, 1959 |
| 2,916,039 | Muller | Dec. 8, 1959 |
| 2,966,157 | Touey et al. | Dec. 27, 1960 |
| 2,999,503 | Schur et al. | Sept. 12, 1961 |

FOREIGN PATENTS

| | | |
|---|---|---|
| 1,084,626 | Germany | June 30, 1960 |
| 823,690 | Great Britain | Nov. 18, 1959 |
| 868,058 | Great Britain | May 17, 1961 |
| 448,889 | Italy | May 27, 1949 |